T. J. THORN.
Churn.
No. 52,340.
Patented Jan'y 30, 1866.
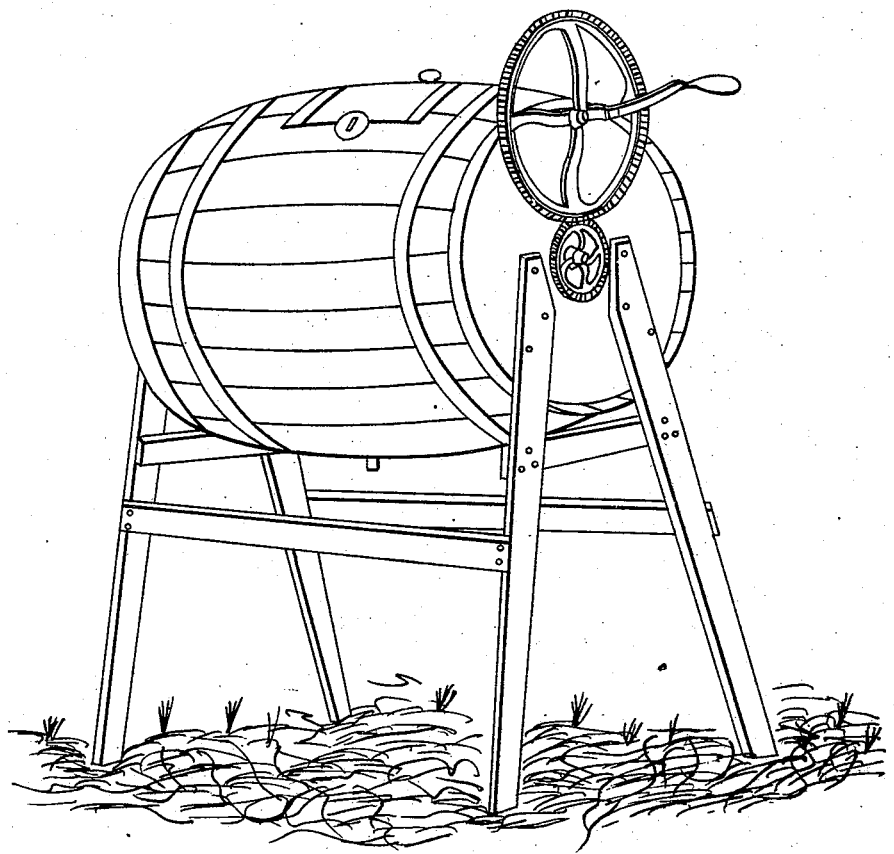
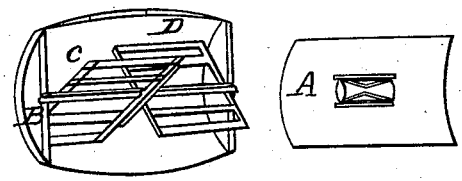
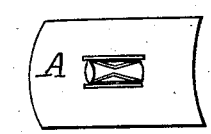
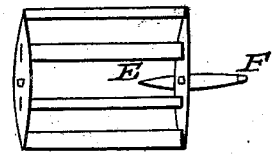
WITNESSES
INVENTOR

UNITED STATES PATENT OFFICE.

THOMAS J. THORN, OF SKANEATELES, NEW YORK.

IMPROVEMENT IN CHURNS.

Specification forming part of Letters Patent No. 52,340, dated January 30, 1866.

*To all whom it may concern:*

Be it known that I, THOS. J. THORN, of Skaneateles, in the county of Onondaga and State of New York, have invented a new and Improved Churn, (Climax;) and I do hereby declare that the following is a full and exact description thereof, reference being had to the accompanying drawings, and to the letters of reference marked thereon.

The nature of my invention consists in the use of a barrel-shaped churn supported horizontally by strong legs and braces, cover fitted into the upper side, perforated in the center for ventilation; also, a stopper in the lower side of the barrel for drawing off the milk, leaving the floating particles of butter in a mass; also, in the use of a combination-tube on the under side of the cover for preventing the escape of cream; also, two paddles formed of bars alternating and differing in width, said paddles crossing each other at right angles; also, a movable shaft held in position at the end of the barrel by a wooden pin; also, a short shouldered shaft with face-plate, and spurs connecting the paddles with the gearing on the outside of the barrel.

To enable others skilled in the art to make and use my invention, I will proceed to describe its construction and operation.

I construct the barrel in the usual form, with iron hoops and thick heading. I make the paddles C D of bars of wood, differing in width and in distance each from the other, the paddles also crossing each other at right angles in order to stir the cream thoroughly and produce uniformity of motion. I join the paddles together by the arms E F, E having a tenon fitting a loop or slot at the extremity of one arm of the other paddle, F having a loop or slot fitting tenon at the extremity of the opposite arm. I make the shaft G square, passing through square holes in paddles, holding them firmly together when adjusted, but easily removed at pleasure. The combination-tube A, I construct of two half-sections of conical-shaped tubing, soldered together, with lips on each side fitting slides in the cover. The short shaft and face-plate H, I make of iron, tinned to prevent rusting.

What I claim as my invention is—

The combination and arrangement of the paddles C and D, arranged at a right angle to each other, substantially as described, with the tube A for ventilation, the whole arranged in the manner shown and specified.

THOMAS J. THORN.

Witnesses:
MERRITT GALLY,
C. C. THORN,
W. E. HUYHITT.